Dec. 15, 1964    J. A. HAMILTON ETAL    3,161,516
PHOTOGRAPHIC FILM ASSEMBLAGE
Filed May 26, 1961    4 Sheets-Sheet 1

INVENTORS
Joel A. Hamilton
Philip D. Bartlett
By Brown and Mikulka
and
Robert E. Corb
ATTORNEYS Dec. 15, 1964   J. A. HAMILTON ETAL   3,161,516
PHOTOGRAPHIC FILM ASSEMBLAGE Filed May 26, 1961   4 Sheets-Sheet 2

INVENTORS
Joel A. Hamilton
Philip D. Bartlett
BY Brown and Mikulka
and
Robert E. Corb
ATTORNEYS

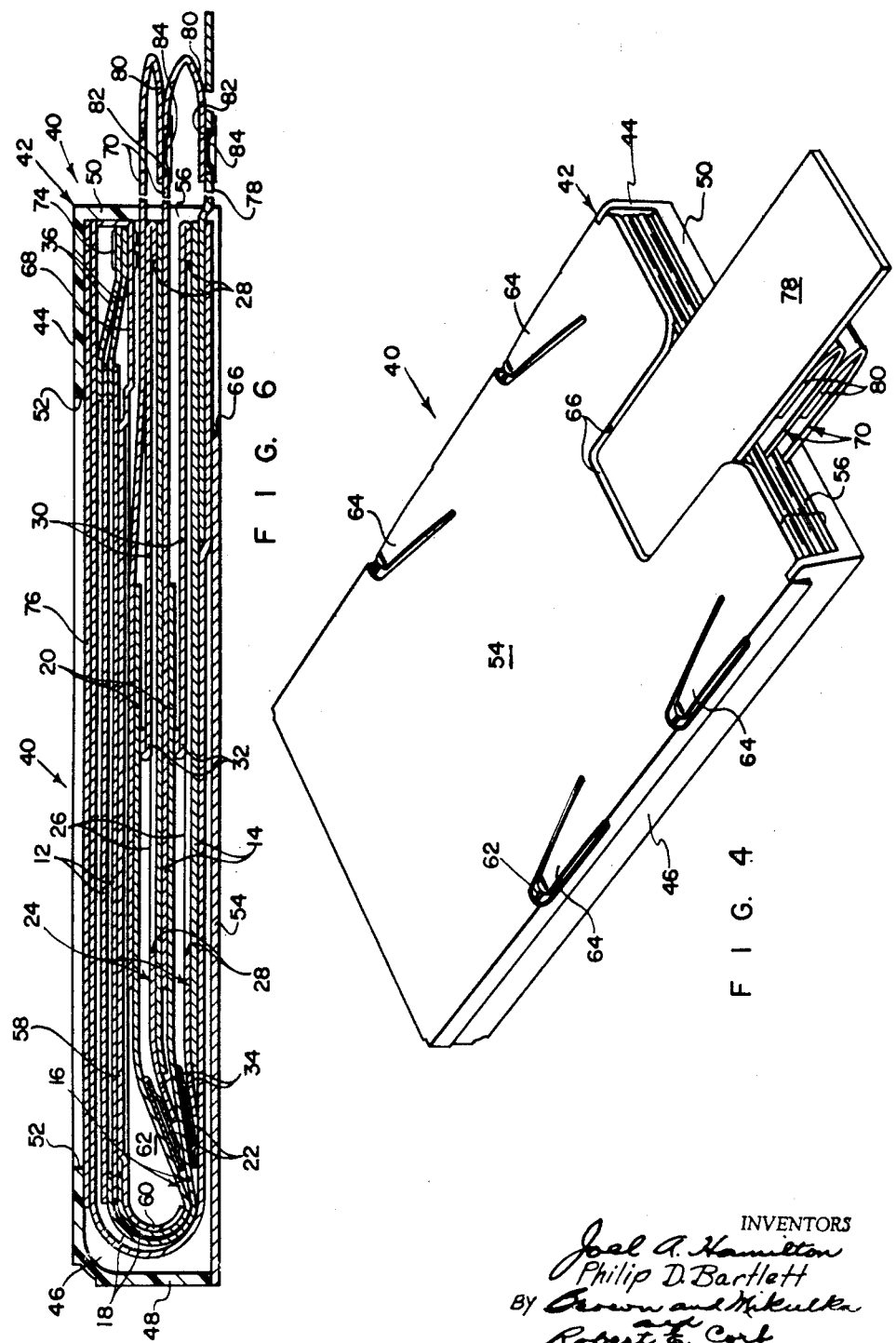

Dec. 15, 1964   J. A. HAMILTON ETAL   3,161,516
PHOTOGRAPHIC FILM ASSEMBLAGE
Filed May 26, 1961   4 Sheets-Sheet 4
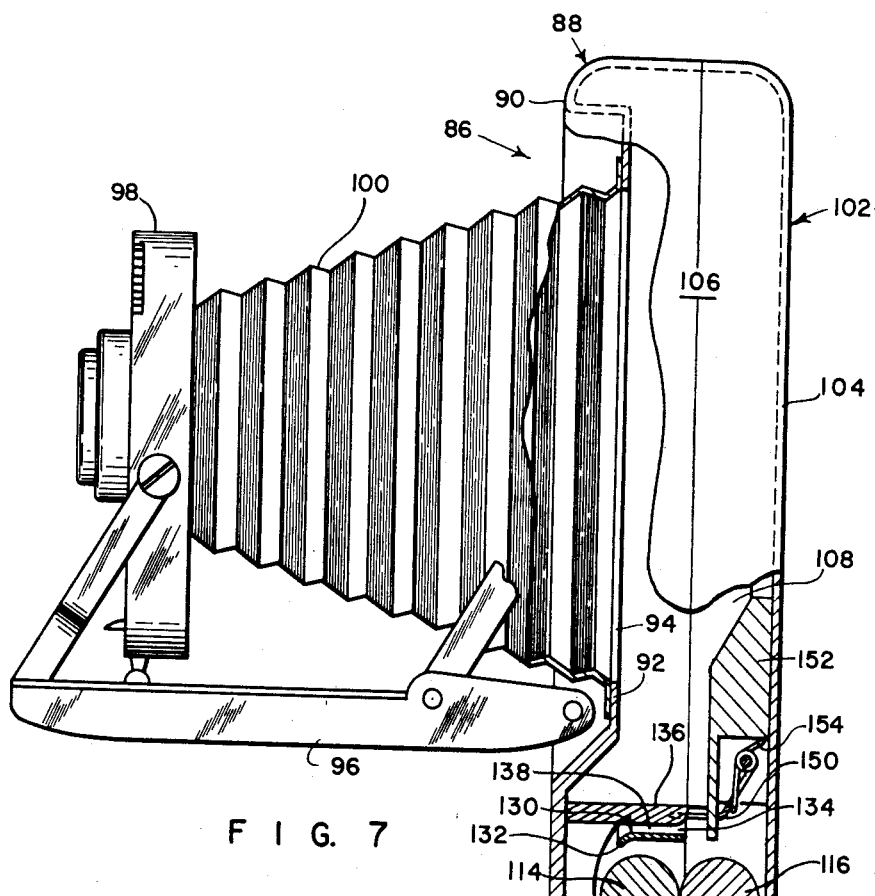
INVENTORS
Joel A. Hamilton
Philip D. Bartlett
BY Brown and Mikulka
and
Robert E. Cort
ATTORNEYS United States Patent Office 3,161,516
Patented Dec. 15, 1964

3,161,516
PHOTOGRAPHIC FILM ASSEMBLAGE
Joel A. Hamilton, West Medway, and Philip D. Bartlett, Worcester, Mass.; said Hamilton assignor to Polaroid Corporation, Cambridge, Mass., a corporation of Delaware
Filed May 26, 1961, Ser. No. 112,940
8 Claims. (Cl. 96—67)

This invention relates to photographic products and particularly to novel and improved photographic film assemblages.

In the copending application of Richard R. Wareham, Serial No. 715,370, now Patent No. 3,079,849, filed February 14, 1958, there is described a new and improved method of feeding and withdrawing photographic film units from photographic apparatus (such as a camera) between a pair of juxtaposed pressure-applying members to effect the distribution of a processing fluid within the film unit. In this method, a leader attached to the film unit is pulled through and from the apparatus to one side of a pair of juxtaposed pressure-applying members for advancing the leading end of the film unit between the pressure-applying members and from the apparatus so that the leading end of the film unit may be grasped for withdrawing the film unit from the apparatus between the pressure-applying members. There are two primary advantages of this system, the first residing in the fact that it permits a plurality of leaders attached to a plurality of film units to project from the camera (but not between the pressure-applying members) where each leader may be grasped for withdrawing a film unit between the pressure-applying members. Secondly, this system requires two separate pulling steps for each film unit, thereby allowing the film unit to properly align itself with respect to the pressure-applying members during and intermediate the two pulling steps.

In the system described, the leader is attached to the film unit at a position spaced from the leading end of the film unit toward the opposite end thereof and is pulled from the apparatus past the pressure-applying members to advance the leading end of the film unit between the pressure-applying members so that the leader and leading end of the film unit are disposed on opposite sides of one of the pressure-applying members. The pulling movement of the leader is continued until the areas of the leader and film unit at which they are attached are engaged by the one pressure-applying member and further pulling force applied to the leader results in its detachment from the leading end of the film unit, so that the leader does not interfere with subsequent advancement of the film unit between the pressure-applying members. It is desirable that the leader become detached from the film unit as close as possible to its point of attachment to the film unit, yet the manner of attachment must be secure and, hence, of a strength equal to that of the materials comprising the leader and leading end of the film unit.

Heretofore, detachment of the leader from the film unit has been effected by causing the leader to fail in tension; and in order to insure breaking of the leader at the proper location, it has been suggested that the leader be weakened in the area in which failure is supposed to occur, e.g., by having the narrowest portion of the leader occur in this area. Although the strength in tension of the leader is no greater than its narrowest (weakest) portion, the major portion of the leader is of necessity wider and, hence, stronger than would be necessary if the leader were not required to fail (break) in tension.

Objects of the invention are to provide in a film unit of the type described: a leader having a substantially uniform tensile strength throughout its length secured to the film unit in such a manner as to tear from the film unit only when subjected to a shearing force; and a leader as described attached to the film unit in such a way as to tear along lines extending in the direction of movement of the leader and film unit.

Another object of the invention is to provide a novel and improved film unit of the type described in which the leader is secured to the film unit by adhering lateral portions of the leader to the film unit.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a perspective view of a film pack comprising an assemblage of film units;

FIG. 5 is a diagrammatic view taken substantially midway between the sides of the film pack showing one film unit with the components thereof spaced apart to more clearly illustrate the construction and arrangement of the film unit;

FIG. 6 is a longitudinal sectional view taken substantially midway between the sides of the film pack of FIG. 4;

FIG. 7 is an elevational view, partially in section, of photographic apparatus in the form of a camera for employing film units embodying the invention.

Figure 1:
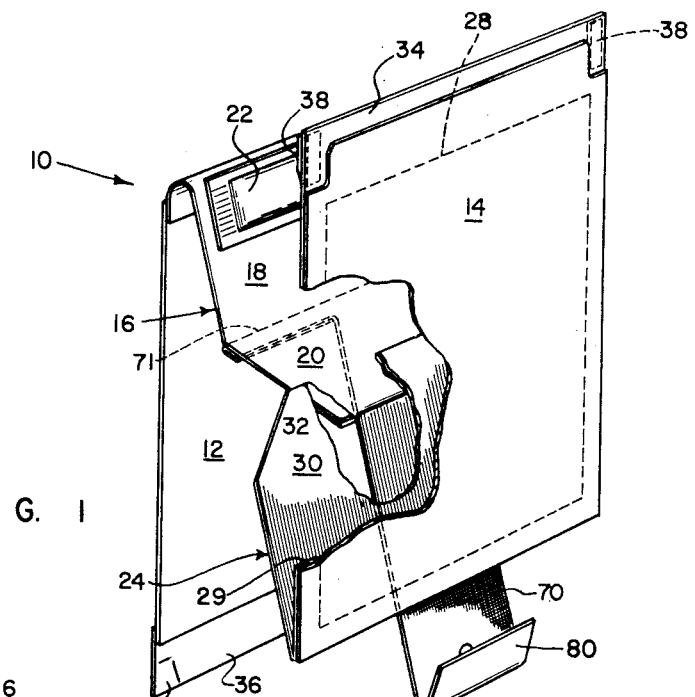
FIGURE 1 is a fragmentary perspective view of a photographic film unit embodying the invention.

Film units embodying the invention may be employed individually or they may comprise an assemblage of film units in the form of a film pack. Generally, each film unit includes a photosensitive sheet which is exposed, a second or print-receiving sheet which is superposed with the exposed photosensitive sheet during processing, and a rupturable container of a processing fluid. Processing of the film unit is effected in the apparatus in which the film unit is exposed by a pair of pressure-applying members, such as rolls, which engage the film unit as the latter is withdrawn from the apparatus and distribute a processing fluid from the container in a layer between the photosensitive and print-receiving sheets. Each film unit includes a leader which serves as means projecting from the apparatus to be grasped for pulling the film unit from the apparatus between the pressure-applying members.

As noted with reference to the above-identified application, the invention finds particular utility in a film pack comprising a plurality of film units which is employed in apparatus in such a way that the leaders of all the film units are required to project from the apparatus so that the leaders may be grasped in succession for withdrawing the film units from the apparatus between the pressure-applying members. Since it is obviously undesirable to have the leader of one film unit extend between the pressure-applying members while another film unit is being drawn between the pressure-applying members to effect the processing thereof, the leaders of the film units extend around and to one side of both of the pressure-applying members rather than between the pressure-applying members; and each leader provides means for advancing a leading end portion of the film unit of which it is a part between the pressure-applying members and from the apparatus where the leading end portion then may be engaged for drawing the film unit between the pressure-applying members from the apparatus. Thus, in order to effect the processing of a film unit following exposure of the photosensitive element of that film unit, the leader of the film unit is grasped and pulled from the apparatus until it becomes detached from the film unit. This serves to advance the leading end of the film unit between the pressure-applying members from the apparatus where the leading end is engaged for pulling the film unit between the pressure-applying members.

An additional advantage of this system, as noted above, resides in the fact that it provides an opportunity for the film unit to properly align itself with respect to the pressure-applying members. For example, when the pressure-applying members comprise rolls, the film unit, if started between the rolls at an angle, will continue to move between the rolls displaced at this angle so that the film unit may eventually jam within the apparatus or the opening provided therein for withdrawal, resulting in damage to the film unit. In the two-step withdrawal system required by the leader arrangement of the invention, the operator grasps and pulls a leader from the apparatus until this leader becomes detached from the film unit. The leader can be guided in such a way as to resist advancement of the film unit in any but the required direction, that is, perpendicular to the axes of the pressure-applying rolls. The walls of the container in which the film unit is enclosed, together with components of the apparatus, also serve to guide the film unit along a proper path until the leading end of the film unit has passed between the pressure-applying members. When the leading end becomes detached from the film unit, the manual pulling force on the film unit is then discontinued momentarily allowing the film unit further opportunity to properly align itself, since any misaligning force is removed. At this point in the film unit withdrawal operation, only a very slight advance of the film unit is required for engagement between the pressure-applying members such that the alignment of the film unit with respect to the members is fixed, and is not subject to change during the remainder of the withdrawal movement. In this way the opportunity for the operator to cause a misalignment of the film unit is limited to the extent of being almost nonexistent, and proper alignment of the film unit is assured.

Reference is now made to FIGS. 1 through 6 of the drawings wherein there are illustrated film units and an assemblage of film units in the form of a film pack. Each film unit, designated 10, comprises a generally rectangular photosensitive sheet 12 and a second or print-receiving sheet 14. Both of these sheets comprise a support which is opaque to light actinic to the photosensitive material of the photosensitive sheet. This photosensitive material comprises a layer of any of the conventional photographic recording media, gelatino silver halide emulsions being the preferred material, carried on a light-opaque flexible sheet such as paper, organic plastics and the like. The second or print-receiving sheet may merely serve to aid in the distribution of a processing fluid in contact with the photosensitive layer or, in the preferred form of film unit, comprises means for supporting a transfer image formed, for example, by a silver halide diffusion-transfer reversal process. Attached to the leading edge of photosensitive sheet 12 is a leader sheet 16 having a first section 18 at which leader sheet 16 is coupled with the photosensitive sheet. First section 18 is approximately equal in width to the photosensitive sheet and provides means for mounting a rupturable container 22 of processing fluid. Leader sheet 16 also includes a tapered end section 20. Second sheet 14 is mounted on a carrier sheet 24 having an intermediate section 26 approximately equal in width to second sheet 14 and having a generally rectangular opening 28 therein defining the area of the second sheet in which image formation occurs. Second sheet 14 is secured to intermediate section 26 so that the portions of the intermediate section bordering on opening 28 provide a mask for defining the image area and cooperating in spreading of the processing fluid. Carrier sheet 24 includes a leading end section 30 having a tapered end portion 32 similar to tapered end section 20 and secured thereto intermediate the ends of tapered end section 20 and tapered end portion 32 of leading end section 30. Tapered end section 20 and end portion 32 cooperate to define the leading end section of the film unit which is advanced between the pressure-applying members.

The length of leader sheet 16 between the leading edge of photosensitive sheet 12 and the point of attachment of the leader sheet to carrier sheet 24 is substantially equal to the length of carrier sheet 24 between its point of attachment to the leader sheet and the leading edge of second sheet 14. It is by virtue of this arrangement that the photosensitive and second sheets are superposed in registered relation during the processing of the film unit. A trailer sheet 36 is provided secured to the trailing edge of photosensitive sheet 12 and cooperates with a trailing end section 34 of carrier sheet 24 which extends beyond the trailing edge of the second sheet, to trap any excess processing fluid which may be carried beyond the trailing ends of the photosensitive and second sheets during distribution of the processing fluid. Distribution of the processing fluid, as noted, is effected by advancing the photosensitive and second sheets and container of processing fluid in super-position relative to and between a pair of juxtaposed pressure-applying members. The members apply compressive pressure to the sheets progressively, commencing in the area of the container, to cause the ejection of the fluid contents of the container between the sheets and the spreading of the fluid in a layer between and in contact with the sheets. To aid in trapping of excess fluid, spacing members 38 are provided on trailing end section 34 adjacent the margins thereof for spacing apart the pressure-applying members to provide a gap between trailing end section 34 and trailer sheet 36 in which any excess processing fluid may be collected and retained.

The rupturable container is of the type shown and described in Patent No. 2,543,181, issued February 27, 1951, in the name of Edwin H. Land, and comprises a rectangular blank of fluid- and air-impervious sheet material folded longitudinally upon itself to form two walls which are sealed to one another along their longitudinal and end margins to form a cavity in which the processing fluid is contained. The longitudinal marginal seal is made weaker than the end seal so as to become unsealed in response to hydraulic pressure generated within the fluid contents of the container by the application of compressive pressure to the walls of the container. Container 22 is mounted on first section 18 of leader sheet 16 with this longitudinal marginal seal directed toward the leading edge of the photosensitive sheet.

The fluid contents of the container are preferably adapted to effect the formation of a transfer image on print-receiving sheet 14 in the area thereof defined by opening 28 in carrier sheet 24. For details concerning the composition of the fluid and materials useful for the photosensitive and print-receiving sheets and the processes performed by such materials, reference may be had to the above-mentioned Patent No. 2,543,181 and to Patent No. 2,662,822, issued December 15, 1953, in the name of Edwin H. Land.

A film pack or assemblage of film units 10 is shown in FIGS. 4 and 6 of the drawings. This film pack, designated 40, comprises a generally parallelepiped-shaped container or box 42 for holding and enclosing a plurality of film units 10. Container 42 is shown as comprising two sections, including a forward section having a forward wall 44, side walls 46, a trailing end wall 48, and a leading end wall 50. Forward wall 44 is provided with a generally rectangular exposure aperture 52 for transmitting light for exposing the photosensitive sheets of film units carried within the container. Leading end wall 50 comprises only a partial wall, i.e., it does not extend rearwardly to the same extent as the side walls, which cooperates with the rear section of the container to provide a passage 56 at the leading end of the container through which film units carried by the container are withdrawn. The rear section of the container comprises a rear wall 54 secured to side walls 46 and formed preferably of a resilient sheet metal.

The arrangement of each film unit within container 42 is illustrated in FIGS. 1 and 5; and the arrangement of a plurality of film units (two are shown) is illustrated in FIG. 6. Each film unit is arranged with the photosensitive and second sheets in overlying relation with the photosensitive surface of the photosensitive sheet facing outward and with the surface of the print-receiving sheet which is superposed therewith, during processing, facing inwardly in the same direction. Leader sheet 16 is folded or curved adjacent the leading edge of photosensitive sheet 12 intermediate that edge and container 22, and carrier sheet 24 is similarly folded adjacent the leading edge of second sheet 14 so that the portions of the leader sheet and carrier sheet which connect the photosensitive and second sheets lie therebetween; and the leading and trailing ends of the photosensitive sheet are disposed adjacent, respectively, the trailing and leading ends of the second sheet. The film pack is provided with a generally flat, rectangular pressure plate 58 located intermediate photosensitive sheet 12 and the other portions of the film unit for supporting the photosensitive sheet against the inner surface of forward wall 44 in position for exposure through aperture 52. Pressure plate 58 includes a rolled end section 60 around which extends the curved portion of leader sheet 16. Rolled end section 60 is provided for guiding photosensitive sheet 12 around the end of the pressure plate in a manner to be described hereinafter. The major portion of first section 18 of leader sheet 16, rupturable container 22 mounted thereon, tapered section 20 and the leading end section 30 of carrier sheet 24 are located behind pressure plate 58 between the latter and second sheet 14. Pressure plate 58 is provided with lateral flanges 62 disposed adjacent side walls 46 of the container. Rear wall 54 of the housing is provided with springs 64 formed from the rear wall and biased inwardly for engaging lateral flanges 62 and biasing pressure plate 58 toward forward wall 44 to retain the photosensitive sheet in position for exposure. Rear wall 54 is also provided with a U-shaped opening or enlarged notch 66 in the end portion thereof adjacent opening 56, the purpose of opening 66 to be described hereinafter.

Figure 2:
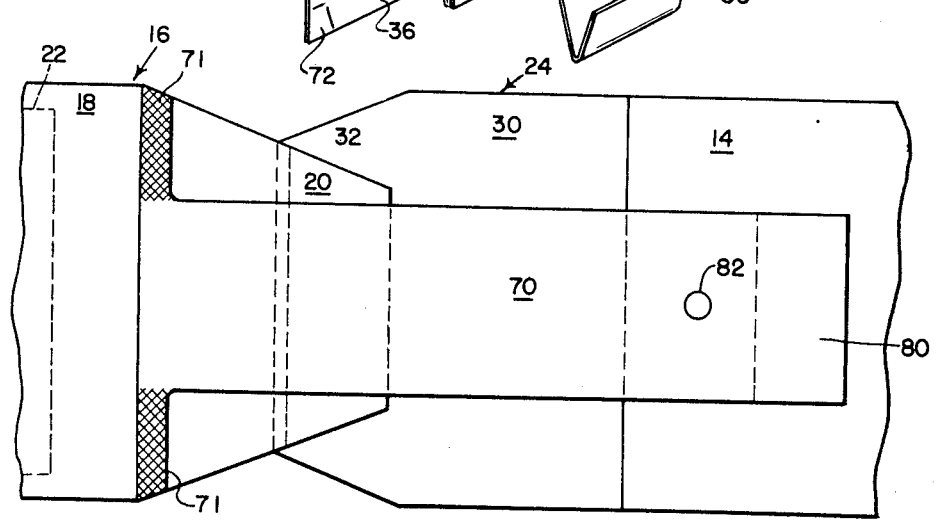
FIG. 2 is a plan view showing in detail portions of the film unit of FIG. 1.
Figure 9:
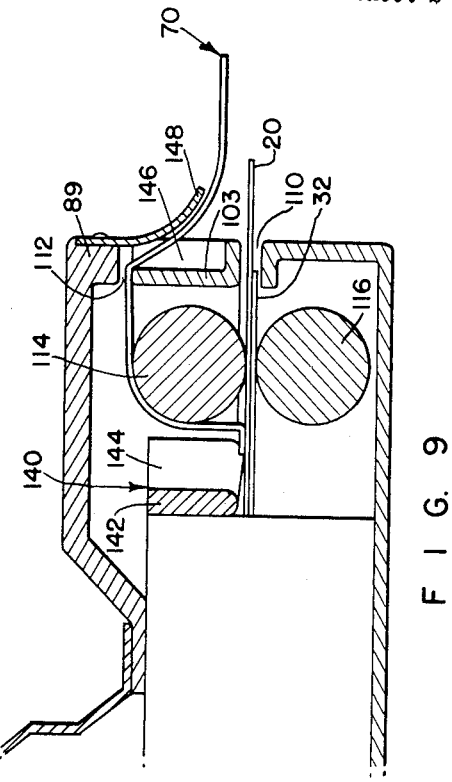

The means for withdrawing each film unit 10 from container 42 with the photosensitive and print-receiving sheets 12 and 14 in superposition and advancing tapered end section 20 between a pair of pressure-applying members comprises a relatively narrow elongated leader 70 secured at the trailing end of the leader to tapered end section 20 intermediate first section 18 and the point of attachment of the tapered end section to tapered portion 32. Leader 70, in the form shown in FIG. 2, is generally T-shaped at its leading end, having laterally extending arms 71 which are adhered to tapered end section 20 in the area designated by cross-hatching. Leader 70 is of substantially uniform width throughout the major portion of its length, that is, except in the area of its trailing end comprising laterally extending arms 71, so that the strength of leader 70 in tension is substantially uniform throughout the length of the leader. The areas of adherence of leader 70 to tapered end section 20 are defined by inner facing edges which extend substantially in the direction of movement of the leader and, as shown in FIG. 2, comprise extensions of the lateral edges of the major portion of a leader 70. Arms 71 are adhered to tapered end section 20 by any suitable adhesive material which will form a bond at least equal in strength to the sheet materials (paper) comprising the leader and tapered end section. The construction of leader 70 and its manner of attachment to tapered end section 20 are such that the application of a shearing force to leader 70, effected by applying tension to the leader in a direction at an angle from the plane of tapered end section 20 and arms 71, causes leader 70 to tear at the bases of arms 71 along lines extending in the direction of movement of the leader. By virtue of this construction, as long as the leader and film unit coupled therewith are being moved in approximately the same direction, then the leader at arms 71 is in tension and does not fail. However, when the direction of movement of leader 70 and tapered end section 20 diverges sufficiently (as shown in FIG. 9) the trailing end section of the leader is subjected to a shearing force which causes the leader to tear and thereby become detached from tapered end section 20.

Figure 3:
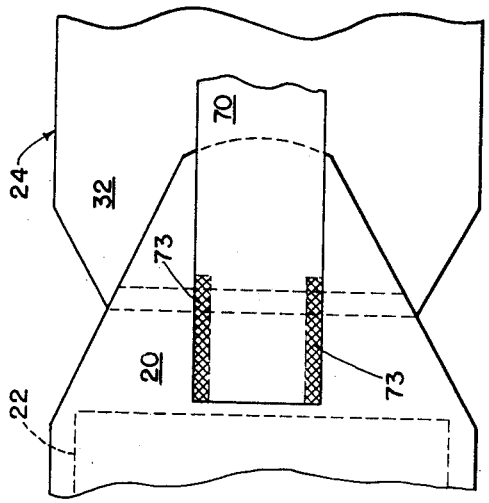
FIG. 3 is a view similar to FIG. 2 illustrating another embodiment of the film unit.

Another form of leader 70 is shown in FIG. 3 of the drawings and comprises an elongated narrow blank of substantially uniform width throughout its length. Leader 70, in FIG. 3, is secured to tapered end section 20 at two lateral areas 73, designated in the drawings by cross-hatching. These lateral areas 73 are relatively narrow and elongated and are defined by inner facing edges, designated by broken lines, which extend substantially parallel to the lateral edges of leader 70, and it is along these inner facing edges that leader 70 tears when subjected to a shearing force as described. It is obvious that leader 70, in FIG. 3, is of uniform tensile strength throughout its length, yet the manner of attachment of the leader to tapered end section 20 at areas 73 tends to cause the leader to become detached easily by tearing from tapered end section 20 at the proper time when subjected to a shearing force.

Leader 70 extends from container 42 through opening 56 therein and, when drawn from the container, advances a photosensitive sheet 12 around rolled end section 60 of pressure plate 58 into superposition with a second sheet 14 and then advances the two sheets in superposition within the container towards opening 56. As leader 70 commences to advance towards opening 56, tapered end section 32 of carrier sheet 24 is required to commence rolling upon itself toward the opening in response to movement of tapered end section 20 of leader sheet 16 toward the same opening. It is for this reason that section 20 and portion 32 are tapered, since this provides for the weakest portion of end portion 32 in the area where the end portion is required to commence rolling. Means are also provided for preventing movement of photosensitive sheets underlying the foremost photosensitive sheet as the latter is moved from exposure position around the end of the pressure plate. This means comprises an end section 68 of pressure plate 58 to which are attached corner portions 72 of trailing end sections 34. Corner portions 72 may be precut, as shown, to insure separation from the remainder of trailing end section 34 and may be secured to end section 68 of the pressure plate by suitable means such as staples 74.

Film pack 40 is provided with means for initially sealing aperture 52 against the admission of light until the pack has been loaded into the camera in which it is to be employed. This light-sealing means comprises a cover sheet 76 (double) of a light-impervious material located between the foremost photosensitive sheet and forward wall 44 across opening 52. Cover sheet 76 extends around the curved end of the pressure plate behind the latter to a position against rear wall 54 with the leading end of the cover sheet located adjacent passage 56. An elongated leader 78, similar to leader 70, is secured to cover sheet 76 at a position thereon spaced inwardly from the leading end of the cover sheet to provide means for withdrawing cover sheet 76 from container 42 after the container has been loaded into a camera.

Figure 8:
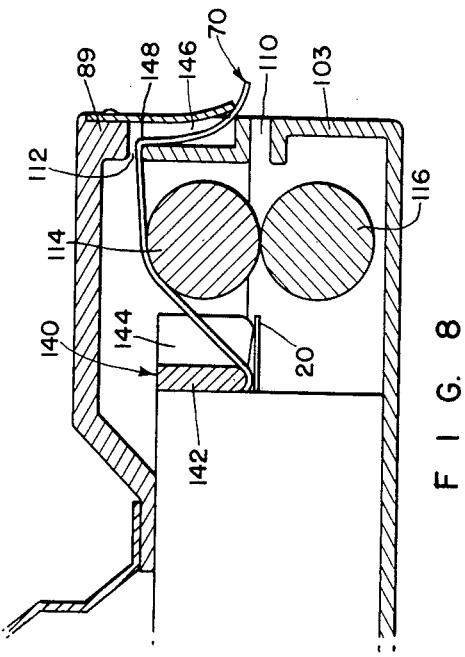
FIGS. 8 and 9 are fragmentary sectional views similar to FIG. 7 illustrating another embodiment of the camera and showing in detail the function of the invention.

The film units incorporating the invention and comprising film pack 40 are adapted to be employed in photographic apparatus such as a hand-held camera 86, illustrated in FIGS. 7 through 9 of the drawings. Camera 86 comprises a housing including a forward section 88 having a forward wall 90 with a recessed or reentrant section 92 and an aperture 94 in the reentrant section for transmitting light for exposing the photosensitive sheets of a film pack positioned for exposure within the camera. A hinged door 96 is provided for covering recessed section 92 and for mounting a conventional lens and shutter assembly 98, the latter being connected to recessed section 92 by a collapsible bellows 100 secured at one end to the lens and shutter assembly and secured at its other end to the recessed section in surrounding relation to aperture 94. In lieu of door 96, lens and shutter assembly 98 and bellows 100, the camera housing can be constructed in the form of a camera back or film pack adapter intended to be mounted on or coupled with a camera or other photographic exposure device.

The camera housing includes a rear section 102 having a rear wall 104 and side walls 106 cooperating with forward housing section 88 to provide a chamber 108 to the rear of forward wall 90 and aperture 94 for containing the film pack in position for exposure through aperture 94. Film pack 40 is mounted within chamber 108 with the wall of the pack located against the rear surface of reentrant section 92 and with aperture 52 in the forward wall of the pack aligned with aperture 94. Rear housing section 102 is preferably pivotably secured to forward housing section 88 adjacent one end of the housing, herein shown and designated for purposes of description as the upper end, by a hinge which permits the two housing sections to be moved apart from one another to allow loading of a film pack into chamber 108. The camera housing includes a lower end wall comprising end wall 89 on forward housing section 88 and another end wall 103 on rear housing section 102. A film withdrawal passage 110 is provided in lower end wall 103 of the housing to permit withdrawal of a film unit from the housing. Suitable latch means (not shown) of a conventional type are also provided in the lower portion of the housing for retaining the two housing sections together in the closed or operative position shown in the drawings.

Camera 86 includes a pair of juxtaposed pressure-applying members in the form of pressure-applying rolls 114 and 116 mounted within chamber 108 adjacent film withdrawal passage 110. Pressure-applying rolls 114 and 116 are mounted for pivotal movement with their axes substantially in a common plane, and resilient means are provided for biasing the rolls toward one another into juxtaposition so as to apply compressive pressure to a film unit during movement thereof between the rolls. The pressure-applying rolls cooperate to form a convergent (and divergent) passage through which the film unit is moved for effecting the processing of the film unit, and this passage between the pressure-applying rolls is located in substantial alignment with withdrawal passage 110. In the arrangement of the pressure-applying rolls shown in the drawings, both rolls are mounted on rear housing section 102 so that when the housing sections are pivoted apart from one another, an assemblage of film units may be loaded into the camera with the leaders thereof extending from the camera past and to one side (forward) of the pressure-applying rolls. Portions of end walls 89 and 103 cooperate to define an opening 112 between the forward and rear housing sections through which the leaders extend from the camera housing.

Camera 86 includes means for guiding tapered end section 20 of film unit 10 between pressure-applying rolls 114 and 116 in response to withdrawal movement of leader 70 past roll 114 to the front thereof and through opening 112. In the form shown in FIG. 7, this guide means comprises a guide bar 130 mounted on rear housing section 102 closely adjacent roll 114 and having a substantially straight rear edge extending from side to side of the camera housing and lying substantially in a plane through the convergent passage between pressure-applying rolls 114 and 116, i.e., tangent to the rolls. An intermediate section 132 of guide bar 130, comprising the forward edge of the guide bar and approximately equal in length to the width of leader 70, is curved toward roll 114 and is located with its forwardmost edge approximately in line with the forwardmost portion of roll 114. A pair of guide members 134 are mounted on the end sections of guide bar 130 adjacent intermediate section 132. The rear surfaces of guide members 134 are located in the plane of the rear edge of guide bar 130 and the two members are provided with facing end surfaces spaced from one another by a distance slightly greater than the width of leader 70. A guide plate 136, approximately equal in length to the width of leader 70, is mounted on forward housing section 88, and extends toward the rear of the camera intermediate guide members 134 adjacent guide bar 130. The rearmost edge of guide plate 136 may be curved, as shown, and is located substantially in the plane of the rear edge of guide bar 130 and rear surfaces of guide members 134. Intermediate section 132 of guide bar 130, guide members 134 and guide plate 136 cooperate with one another to define a guide passage 138 extending generally in a direction from front to rear of the camera and having a width, measured from side to side of the camera, just slightly greater than the width of leader 70, so that the leader may be moved through passage 138. It will be noted that tapered end section 20, at the leading edge thereof, is wider than leader 70 so that tapered end section 20 is unable to enter passage 138. The rear edges of guide bar 130 and guide plate 136 and the rear surfaces of guide members 134 function to support and guide tapered end section 20 of the film unit into the convergent passage between pressure-applying rolls 114 and 116.

In the loading and operation of the camera, the forward and rear housing sections are pivoted apart from one another and a film pack 40 is positioned within the forward housing section with the forward wall of the pack resting against section 92 of the forward wall of forward housing section 88, and with leaders 70 and leader 78 projecting from the pack extending across and to the rear of guide plate 136 and end wall 89. Rear housing section 102 is then pivoted into the operative position shown, causing intermediate section 132 of guide bar 130 to engage the leaders displacing them forwardly so that they extend through passage 138 toward the forward wall of the camera, past pressure-applying roll 114 and through opening 112 in end wall 89. As a leader 70 is withdrawn from the camera through opening 112, tapered end section 20 is withdrawn from the pack and, being unable to enter passage 138, is guided by the guide bar, guide members and guide plate into the convergent passage between the pressure-applying rolls.

Another form of guide means, designated 140, embodying the invention, is illustrated in FIGS. 8 and 9 of the drawings. Guide means 140 is similar in construction to the guide means shown in FIG. 7 and comprises a guide bar 142 and two guide members 144. Guide bar 130 and guide members 134, and the guide bar and guide members of guide means 140 may comprise a single element or three separate elements. Guide means 140 is mounted on forward housing section 88 adjacent forward roll 114 with the rearmost surfaces of guide members 144 disposed approximately in a plane tangent to the surfaces of rolls 114 and 116. The spacing between the facing surfaces of guide members 144 is slightly greater than the width of leader 70 but less than the narrowest portion of tapered end section 20 so that leader 70 may pass between guide members 144 while tapered end section 20 is supported on and guided by members 144 between the pressure-applying rolls. The intermediate section of guide bar 142 and guide members 144 cooperate with one another and roll 114 to define what may be termed a passage through which leader 70 is guided to the front of roll 114 and through opening 112.

Film withdrawal passage 110, in the lower end wall of the camera housing, is at least equal in width to the width of the film unit, whereas opening 112 need be of a width only sufficient to allow the passage of leader 70. It is desirable to allow only one leader at a time to project from the camera where the leader may be grasped; and this is desirable to prevent the operator from accidentally pulling the wrong leader, or pulling more than one leader at a time. For this purpose, end wall 103 is provided with a recess, designated 146, adjacent passage 112 for holding the leading end sections of leaders 70. The leading end sections, designated 80, of leader 70, are folded back upon themselves and each leading end section is detachably adhered to the leader of the preceding film unit, with the leading end section 80 of the first (to be exposed) film unit being attached to leader 78. The folded leading end sections 80 of leaders 70 are contained within recess 146 which is provided with a resilient cover element 148. As leader 78 or a leader 70 is withdrawn through opening 112, the leading end section 80 of the next succeeding leader 70 is unfolded and withdrawn from recess 146 where the leading end section may be grasped for pulling the leader from the camera. By virtue of this arrangement, only one leader at a time extends outside of recess 146 in position to be engaged and withdrawn. A convenient means for detachably securing each leading end section 80 to the previous leader is shown and comprises providing an opening 82 in each leader 70 adjacent leading end section 80 thereof and in leader 78. A piece of pressure-sensitive adhesive tape is secured to the leader across opening 82 so that the adhesive surface of the tape will contact the leading end section 80 of the next succeeding leader through opening 82.

As a photosensitive sheet 12 is being drawn within the pack around curved end 60 of the pressure plate into superposed relation with a second sheet 14, the second sheet tends to move due, for example, to friction between the various sheet materials. Means are provided in the camera for restraining the second sheets 14 against such movement and, in the form shown, comprise an elongated bar 150 pivotally mounted intermediate its ends in a housing 152 mounted on rear wall 104 within chamber 108. Bar 150 is biased by a spring 154 into a forward position with the end sections 156 of bar 150 extending forwardly across the end portions of withdrawal passage 56 in container 42 toward and into engagement with guide members 134. End sections 156, in this position, engage the leading edges of second sheets 14 adjacent the sides thereof for preventing movement of the second sheets toward the pressure-applying rolls. Spring 154 is of sufficient strength to resist the relatively small force exerted by the second sheets due to frictional engagement with the other sheets, but permits bar 150 to be pivoted rearwardly sufficiently to allow the withdrawal of a second sheet 14 when the latter is pulled from container 42 in superposition with a photosensitive sheet 12. The U-shaped opening 66 in rear wall 54 (mentioned earlier) is provided to accommodate housing 152, a portion of which extends into container 42 through opening 66.

In the operation of the film unit of the invention, leader 70 is pulled from the camera advancing tapered end section 20 and tapered end portion 32 between pressure-applying rolls 114 and 116 to the position shown in FIG. 9 at which leader 70 extends from its point of attachment to tapered end section 20 at almost a right angle from the plane of the tapered end section. At this position, the leading end of tapered end section 20 projects through passage 110 a sufficient distance to permit the tapered end section to be grasped, and the application of a continued pulling force on leader 70 results in the exertion of a shearing force to leader 70 at the areas where the leader is attached to the tapered end section and results in tearing of the leader at these areas.

Since certain changes may be made in the above product without departing from the scope of the invention herein involved, it is intended that all matter contained in the above description or shown in the accompanying drawings shall be interpreted as illustrative and not in a limiting sense.

What is claimed is:
1. A photographic film unit comprising, in combination:
   a first sheet;
   a light-sensitive sheet adapted to be exposed and then processed in conjunction with said first sheet by movement in superposition with said first sheet between a pair of juxtaposed pressure-applying members;
   a first leader comprising a sheet coupled with said first and light-sensitive sheets for drawing said first and light-sensitive sheets in superposition between said pressure-applying members, and having a leading end section adapted to be advanced between said juxtaposed members to a position at which said section can be engaged for moving said sheets; and
   an elongated second leader coupled at its trailing end with said first leader and adapted to be drawn to one side of said juxtaposed members for advancing said first leader between said juxtaposed members, at least the major portion of said second leader being narrower than said first leader, said second leader having a strength in tension which is substantially uniform throughout the length of said second leader and being coupled near said trailing end with said first leader at a position thereon spaced from the leading edge of said first leader toward the opposite end thereof;
   said second leader including laterally spaced portions at said trailing end at which said second leader is adhered to said first leader by an adhesive bond which is at least as strong in shear as said second leader is in tension, said portions of said second leader being adhered to said first leader at areas of said leaders having facing edges which are linear and extend lengthwise of said first leader, the latter having a strength in shear which is less than the tensile strength of said adhesive bond and the shear strength of said first leader so that said second leader tends to tear lengthwise along said facing edges of said areas in response to the application of tension to said first leader in a direction divergent from the direction of movement of said first leader between said pressure-applying members.

2. The photographic film unit of claim 1 wherein said second leader is of substantially uniform width throughout said major portion of its length.

3. The photographic film unit of claim 2 wherein said trailing end of said second leader is substantially wider than said major portion of said second leader providing said portions at which said second leader is adhered to said first leader, and said facing edges of said areas are aligned substantially with the lateral edges of said major portion of said second leader.

4. The photographic film unit of claim 2 wherein said second leader is of substantially uniform width throughout its entire length.

5. A photographic film assemblage comprising, in combination:
   a film unit including a first leader for withdrawing said film unit from said assemblage and a second leader coupled with said first leader at a location spaced from the leading edge thereof for withdrawing said first leader from said assemblage;

at least another element including a leader adapted to be withdrawn from said assemblage by the application of tension to the last-mentioned leader; and a container enclosing said film unit and said other element, said container having an opening through which said film unit and said element are movable and through which said second and last-mentioned leaders project adjacent one another;

the end portion of said second leader being folded upon itself toward said last-mentioned leader and being adhered in face-to-face relation to said last-mentioned leader by a bond having a tensile strength less than the shear strengths of said leaders with said end portion of said last-mentioned leader extending beyond said folded end portion of said second leader so that the latter is unfolded and separated from said last-mentioned leader during and in response to withdrawal thereof from said container through said opening.

6. The photographic film assemblage of claim 5 in which said other element is another of said film units and said second leader of the first-mentioned film unit is adhered to the second leader of said other film unit.

7. The photographic film assemblage of claim 5 in which said container includes an aperture for admitting light to expose light-sensitive materials within said container comprising said film unit, and said other element includes a section disposed in covering relation to said aperture.

8. A photographic film assemblage as defined in claim 7 comprising a plurality of said film units arranged to be exposed and withdrawn in succession from said container, each of said film units including a second leader having an end portion folded upon itself and adhered to said second leader of the preceding film unit, said end portion of said second leader of the first film unit being located adjacent said last-mentioned leader and being adhered thereto, said second leader and the end portions thereof being of substantially equal length and extending substantially the same distance through said opening.

References Cited in the file of this patent
UNITED STATES PATENTS

| | | |
|---|---|---|
| 2,088,145 | Von Biehler | July 27, 1937 |
| 2,495,112 | Wolff | Jan. 17, 1950 |
| 2,525,720 | Pinkham | Oct. 10, 1950 |
| 2,669,168 | Land | Feb. 16, 1954 |
| 2,735,771 | Fordyce et al. | Feb. 21, 1956 |
| 3,079,849 | Wareham | Mar. 5, 1963 |